(12) United States Patent
Jin et al.

(10) Patent No.: US 11,327,207 B2
(45) Date of Patent: May 10, 2022

(54) PRISM FILM, BACKLIGHT MODULE AND DISPLAY DEVICE

(71) Applicant: BOE TECHNOLOGY GROUP CO., LTD., Beijing (CN)

(72) Inventors: Liangliang Jin, Beijing (CN); Zezhou Yang, Beijing (CN); Ruoyu Ma, Beijing (CN); Qing Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/161,029

(22) Filed: Jan. 28, 2021

(65) Prior Publication Data

US 2021/0165139 A1 Jun. 3, 2021

Related U.S. Application Data

(63) Continuation of application No. 16/199,733, filed on Nov. 26, 2018, now Pat. No. 10,921,497.

(30) Foreign Application Priority Data

Mar. 29, 2018 (CN) .......................... 201810272472.0

(51) Int. Cl.
*G02F 1/13357* (2006.01)
*G02B 5/04* (2006.01)
(Continued)

(52) U.S. Cl.
CPC ........... *G02B 5/045* (2013.01); *G02B 6/0053* (2013.01); *G02B 26/0891* (2013.01);
(Continued)

(58) Field of Classification Search
CPC ......................................... G02B 6/0058–0061
See application file for complete search history.

(56) References Cited

U.S. PATENT DOCUMENTS

| 4,936,657 A | 6/1990 | Tejima et al. |
| 5,797,668 A | 8/1998 | Kojima et al. |
| (Continued) | | |

FOREIGN PATENT DOCUMENTS

| CN | 1834754 A | 9/2006 |
| CN | 101796437 A | 8/2010 |
| (Continued) | | |

OTHER PUBLICATIONS

China First Office Action, Application No. 201810272472.0, dated Feb. 21, 2020, 23 pps.: with English translation.
(Continued)

*Primary Examiner* — Andrew J Coughlin
(74) *Attorney, Agent, or Firm* — Armstrong Teasdale LLP (57) ABSTRACT

Embodiments of the present disclosure relate to a prism film, a backlight module, and a display device. The prism film includes a substrate and a plurality of prisms on a surface of the substrate, each of the plurality of prisms having a triangular cross section, and having a first optical surface, a second optical surface, and a third optical surface that are perpendicular to the triangular cross section, wherein the first optical surface is parallel to the surface of the substrate, the first optical surface and the second optical surface form a first bottom angle, the first optical surface and the third optical surface form a second bottom angle, and at least one of the first bottom angle and the second bottom angle of the plurality of prisms gradually changes.

14 Claims, 8 Drawing Sheets

(51) Int. Cl.
*F21V 8/00* (2006.01)
*G02B 26/08* (2006.01)
*G02F 1/1335* (2006.01)

(52) U.S. Cl.
CPC .. *G02F 1/133606* (2013.01); *G02F 1/133611* (2013.01); *G02F 1/133607* (2021.01)

(56) References Cited

U.S. PATENT DOCUMENTS

| | | |
|---|---|---|
| 6,222,689 B1 | 4/2001 | Higuchi et al. |
| 6,799,859 B1 | 10/2004 | Ida et al. |
| 7,529,461 B1 | 5/2009 | Chen et al. |
| 2006/0250817 A1 | 11/2006 | Yamashita et al. |
| 2007/0133226 A1 | 6/2007 | Mi |
| 2012/0113158 A1 | 5/2012 | Goto et al. |
| 2017/0235029 A1 | 8/2017 | Diao et al. |
| 2019/0285790 A1 | 9/2019 | Usukura et al. |

FOREIGN PATENT DOCUMENTS

| | | |
|---|---|---|
| CN | 102053292 A | 5/2011 |
| CN | 102654589 A | 9/2012 |
| CN | 106680916 A | 5/2017 |
| CN | 107610590 A | 1/2018 |
| KR | 20080060654 A | 7/2008 |

OTHER PUBLICATIONS

China Second Office Action, Application No. 201810272472.0, dated Sep. 10, 2020, 21 pps.: with English translation.
U.S. Non-Final Office Action, U.S. Appl. No. 16/199,733 , dated Aug. 6, 2020, 26 pages.

PRISM FILM, BACKLIGHT MODULE AND DISPLAY DEVICE

CROSS REFERENCE TO RELATED APPLICATIONS

This patent application is a continuation application of U.S. patent application Ser. No. 16/199,733 filed on Nov. 26, 2018, which claims the benefit and priority of Chinese Patent Application No. 201810272472.0 filed on Mar. 29, 2018, the disclosures of which are incorporated by reference herein in their entirety as part of the present application.

BACKGROUND

Embodiments of the present disclosure relate to the field of display technologies, and in particular, to a prism film, a backlight module, and a display device.

The liquid crystal display panel has been developed into a mature display technology and may be applied to various fields. As an application example, a liquid crystal display panel may be used in virtual reality (VR) display technology to present visual information for visual perception. By means of the imaging lens and the stereoscopic display technology, the information presented on the display panel may be perceived as real, so that a very realistic experience may be provided.

BRIEF DESCRIPTION

Embodiments of the present disclosure provide a prism film, a backlight module, and a display device.

An aspect of the present disclosure provides a prism film. The prism film includes a substrate and a plurality of prisms on a surface of the substrate, each of the plurality of prisms having a triangular cross section, and having a first optical surface, a second optical surface, and a third optical surface that are perpendicular to the triangular cross section. The first optical surface is parallel to the surface of the substrate, the first optical surface and the second optical surface form a first bottom angle, and the first optical surface and the third optical surface form a second bottom angle. At least one of the first bottom angle and the second bottom angle of the plurality of prisms gradually changes.

In an embodiment, the plurality of prisms are arranged in parallel in a direction parallel to the surface of the substrate. The first bottom angle and the second bottom angle are configured such that light entering the prism from the second optical surface may be reflected toward the first optical surface by the third optical surface, and then emerge from the first optical surface in a way of being deflected toward a center of the substrate.

In an embodiment, the direction is a direction of a horizontal component of the light parallel to the surface of the substrate, and the at least one of the first bottom angle and the second bottom angle of the plurality of prisms gradually increases in the direction.

In an embodiment, the first bottom angle and the second bottom angle are configured to satisfy the following relationship:

$$\sin\theta 8 = n * \sin\left[\alpha 1 + 2*\alpha 3 - \pi + \arcsin\frac{\sin(\theta 1 - \alpha 1)}{n}\right]$$

$$\arcsin\frac{\sin(\theta 1 - \alpha 1)}{n} > \frac{\pi}{2} - \alpha 1 - \alpha 3$$

wherein θ1 represents an angle, facing the substrate, between a direction of light incident on the prism and a normal to the surface of the substrate, n represents a refractive index of the prism, α1 represents the first bottom angle, α3 indicates the second bottom angle, and θ8 represents an outgoing angle of light emerging from the first optical surface.

In an embodiment, the first bottom angle and the second bottom angle are configured such that the light incident to the third optical surface is totally reflected at the third optical surface, wherein the first bottom angle and the second bottom angle are further configured to satisfy the following relationship:

$$\theta 5 = \pi - \alpha 1 - \alpha 3 - \arcsin\frac{\sin(\theta 1 - \alpha 1)}{n} > \arcsin\frac{1}{n}$$

where θ5 represents an incident angle of the light at the third optical surface.

In an embodiment, the triangular cross section is an isosceles triangular cross section.

In an embodiment, 65°≤θ1≤85°.

In an embodiment, the second bottom angle is a right angle, and the first bottom angle is configured such that light entering the prism from the first optical surface may be directly incident on the second optical surface, and then emerge from the second optical surface in a way of being deflected toward the center of the substrate.

In an embodiment, the first bottom angle of the plurality of prisms gradually decreases from an edge of the substrate toward the center of the substrate.

In an embodiment, the first bottom angle is configured to satisfy the following relationship:

$$\delta = \arcsin\left[n*\sin\left(\alpha 1 + \arcsin\frac{\sin\beta 1}{n}\right)\right] - \alpha 1$$

$$\alpha 1 + \arcsin\frac{\sin\beta 1}{n} < \arcsin\frac{1}{n}$$

wherein δ represents an angle between the light emerging from the second optical surface and a normal to the first optical surface, n represents a refractive index of the prism, α1 represents the first bottom angle, and β1 represents an incident angle of the light at the first optical surface.

In an embodiment, 0°≤β1≤20°.

In an embodiment, the plurality of prisms are arranged in parallel in a direction parallel to the surface of the substrate.

In an embodiment, the plurality of prisms are arranged in a form of a plurality of concentric circles.

Another aspect of the present disclosure provides a backlight module. The backlight module includes a light guide plate and a prism film on a light outgoing side of the light guide plate, for example, a prism film provided according to one or more embodiments of the present disclosure.

In an embodiment, the plurality of prisms are arranged in parallel along a direction parallel to the surface of the substrate. The first bottom angle and the second bottom angle are configured such that light entering the prism from the second optical surface may be reflected toward the first optical surface by the third optical surface, and then emerge from the first optical surface in a way of being deflected toward the center of the substrate. A side of the prism film provided with the prisms is opposite to a light outgoing side of the light guide plate, and an outgoing angle of light emerging from the light guide plate ranges from about 65° to about 85°.

In an embodiment, the triangular cross section is a right triangle cross section, and the first bottom angle is configured such that light entering the prism from the first optical surface may be directly incident on the second optical surface, and then emerge from the second optical surface in a way of being deflected toward the center of the substrate. A side of the prism film provided with the prism faces away from the light outgoing side of the light guide plate, and the outgoing angle of the light emerging from the light guide plate ranges from 0° to about 20°.

Another aspect of the present disclosure provides a display device. The display device includes a prism film, such as the prism film provided according to one or more embodiments of the present disclosure.

In an embodiment, the display device may further include a backlight module and a display panel. The prism film is located between a light guide plate of the backlight module and the display panel. The plurality of prisms are arranged in parallel in a direction parallel to a surface of the substrate. The first bottom angle and the second bottom angle are configured such that light entering the prism from the second optical surface may be reflected toward the first optical surface by the third optical surface, and then emerge from the first optical surface in a way of being deflected toward the center of the substrate. A side of the prism film provided with the prisms is opposite to a light outgoing side of the light guide plate, and an outgoing angle of light emerging from the light guide plate ranges from about 65° to about 85°.

In an embodiment, the display device further includes a display panel. The prism film is located on a light outgoing side of the display panel. The triangular cross section is a right triangle cross section. The first bottom angle is configured such that light entering the prism from the first optical surface may be directly incident on the second optical surface, and then emerge from the second optical surface in a way of being deflected toward the center of the substrate. A side of the prism film provided with the prisms faces away from a light outgoing side of the display panel, and an outgoing angle of the light emerging from the light guide plate ranges from about 0° to about 20°.

In an embodiment, the display device is a virtual reality display device.

Further adaptive aspects and scopes become apparent from the description provided herein. It should be understood that various aspects of the present disclosure may be implemented separately or in combination with one or more other aspects. It should also be understood that the description in the present disclosure which is intended to be merely described in the specific embodiments is not intended to limit the scope of the present disclosure.

BRIEF DESCRIPTION OF THE DRAWINGS

The accompanying drawings set forth herein are merely for the purpose of describing the selected embodiments, are not all possible implementations and are not intended to limit the scope of the present disclosure, in which.

Throughout the various diagrams of these drawings, corresponding reference numerals indicate corresponding parts or features.

DETAILED DESCRIPTION

Various embodiments will be described in detail with reference to the accompanying drawings, which are provided as exemplary examples of the present disclosure to enable those skilled in the art to implement the disclosure. Notably, the figures and the examples below are not meant to limit the scope of the present disclosure. Where certain elements of the present disclosure may be partially or fully implemented using known components, only those portions of such known components that are necessary for an understanding of the present disclosure will be described, and the detailed descriptions of other portions of such known components will be omitted so as not to obscure the present disclosure. Further, various embodiments encompass present and future known equivalents to the components referred to herein by way of illustration.

When introducing the elements of this application and their embodiments, the terms "a", "an", "the" and "said" are intended to indicate the presence of one or more elements, unless otherwise stated, the meaning of "multiple/a plurality of" is two or more, the terms "comprising", "including", "containing" and "having" are intended to be inclusive and indicate that there may be additional elements in addition to the listed elements, the terms "first", "second", "third", etc. are used for the purpose of description only, and are not to be construed as suggesting or implying relative importance and order of formation.

Figure 1A:
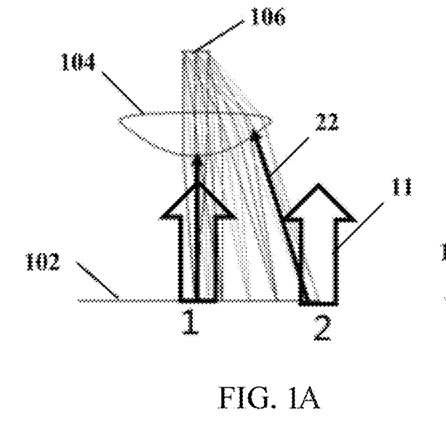
FIG. 1A shows a schematic diagram of an optical path of light exiting from a display screen not matching a desired optical path of a VR.
Figure 1B:
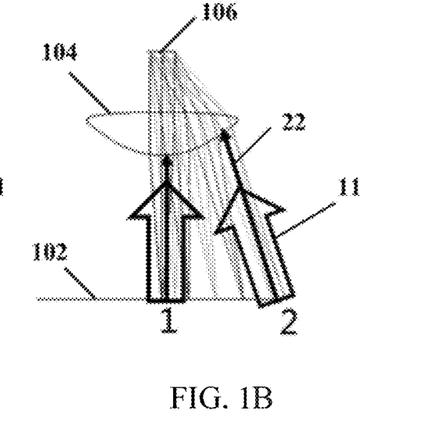
FIG. 1B shows a schematic diagram of the optical path of light exiting from the display screen matching the desired optical path of the VR.

In virtual reality (VR) display technology, an image on a display screen is typically imaged by means of an imaging lens. During the imaging process, only part of the light from the display screen may pass through the lens and then be received by the user's eye. That is to say, only part of the light may be actually utilized, resulting in a large waste of light energy. FIG. 1A shows a schematic diagram of an optical path (represented by thick arrows 11) of light emerging from a display screen not matching a desired optical path (represented by thin arrows 22) of a VR. FIG. 1B shows a schematic diagram of the optical path (represented by thick arrows 11) of light emerging from the display screen matching the desired optical path (represented by thin arrows 22) of the VR. As shown in FIG. 1A, in an actual case, most of the light emerging from the display screen 102 travels in a direction approximately perpendicular to the display screen 102, as indicated by the thick arrows 11. Light located near a center position 1 may enter the user's eye 106 after passing through the imaging lens 104, while most of the light near an edge position 2 cannot enter the user's eye 106 via the imaging lens 104, thus causing waste of light. As shown in FIG. 1B, in the ideal case, the desired optical paths at different positions of the display screen 102 are different. Not only most of the light near the center position 1 may be received by the user's eye 106, but most of the light near the edge position 2 should also match the desired optical path 11 to be received by the user's eye 106, which may improve the utilization rate of light energy. Accordingly, it is desirable to provide an optical structure that may change the direction of light emerging from the display screen in a manner that depends on the position of the display screen such that the optical path of the light emerging from the display screen matches the desired optical path of the VR.

It should be noted that, herein, the term "display device" refers to a device capable of displaying a two-dimensional or three-dimensional image, which may include, for example, a backlight module, a display panel, and other optical films, the term "display panel" refers to a constitute of the display device, and the term "display screen" refers to a screen of the display device capable of displaying an image, which in embodiments of the present disclosure, may refer to a surface on a display image side of the entire display device. Herein, "light emerging from the display screen" refers to light that emerges from the surface of the display image side of the entire display panel, "light emerging from the display panel" and "light emerging from the display screen" may have the same meaning in the case where there is no additional film layer on the outer side of the display panel, but have different meaning in the case where there is an additional film layer (e.g., the prism film provided by the embodiment of the present disclosure) on the outer side of the display panel.

It should be noted that, in an embodiment of the present disclosure, the light emerging from the respective light emerging points of the display screen, the display panel or the light guide plate may generally be a cluster of light beams having a certain divergence angle. The primary light energy of the cluster of light beams is typically concentrated over a small range of angles (e.g., from about 1° to about 20°). For ease of description, in embodiments of the present disclosure, the mentioned descriptions referring to, for example, light or the direction, angle, etc. of light generally mean the central light rays in the cluster of light beams. However, this is not intended to limit the scope of the present disclosure to such particular central light rays, and those skilled in the art will appreciate that light within a range of angles on either side of the central light rays may be suitable for the present disclosure.

An aspect of the present disclosure provides a prism film. The structural parameters of the prism film are designed such that light emerging from the display screen may travel along a predetermined trajectory, such as along a desired optical path 2 of the VR, to take full advantage of the light emerging from both the center and edge positions of the display screen, thereby improving the utilization rate of light energy. The prism film may include a substrate and a plurality of prisms on a surface of the substrate. Each prism has a triangular cross section, and has a first optical surface, a second optical surface, and a third optical surface that are perpendicular to the triangular cross section. In an example embodiment, the first optical surface is parallel to the surface of the substrate. The first optical surface and the second optical surface form a first bottom angle of the prism, and the first optical surface and the third optical surface form a second bottom angle of the prism. At least one of the first bottom angles and the second bottom angles of the plurality of prisms gradually changes.

As used herein, "gradually changing" may include the case of monotonously changing from one side of the substrate to the other side thereof along a direction parallel to the surface of the substrate, and may also include the case of first decreasing and then increasing from one side of the substrate to the other side thereof. The term "surface of the substrate" refers to a surface of the substrate on which the prisms are provided.

Figure 2:
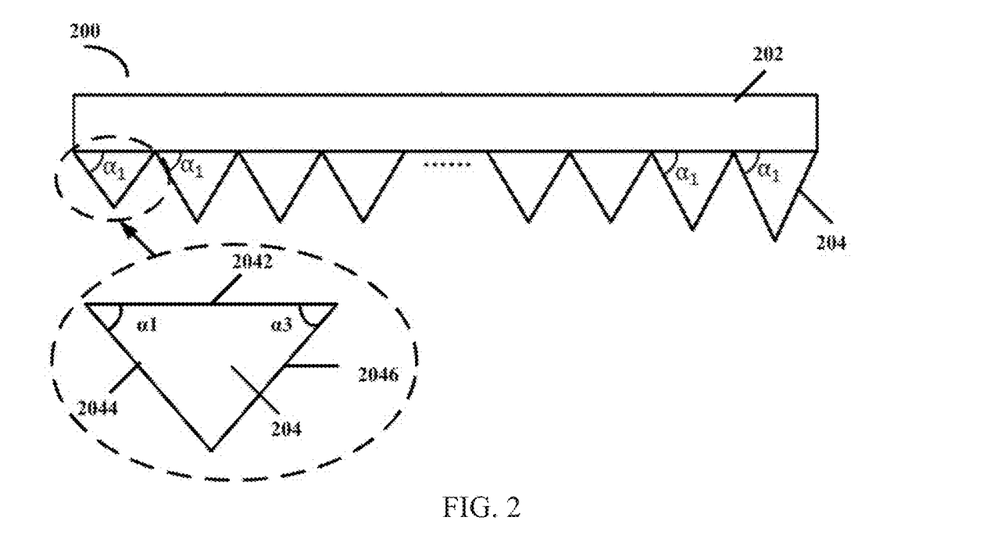
FIG. 2 shows a cross-sectional view of a prism film provided according to an example embodiment of the present disclosure.

FIG. 2 illustrates a cross-sectional view of a prism film provided according to an example embodiment of the present disclosure. In FIG. 2, an enlarged view of the prism 204 (located within the dashed oval below the prism film) is further illustrated. As shown in FIG. 2, the prism film 200 may include a substrate 202 and a plurality of prisms 204 on the surface of the substrate 202. Each prism 204 has a triangular cross section and has a first optical surface 2042, a second optical surface 2044, and a third optical surface 2046 that are perpendicular to the triangular cross section. The first optical surface 2042 is parallel to the surface of the substrate 202. The first optical surface 2042 and the second optical surface 2044 form a first bottom angle $\alpha 1$ of the prism, and the first optical surface 2042 and the third optical surface 2046 form a second bottom angle $\alpha 3$ of the prism.

Figure 3:
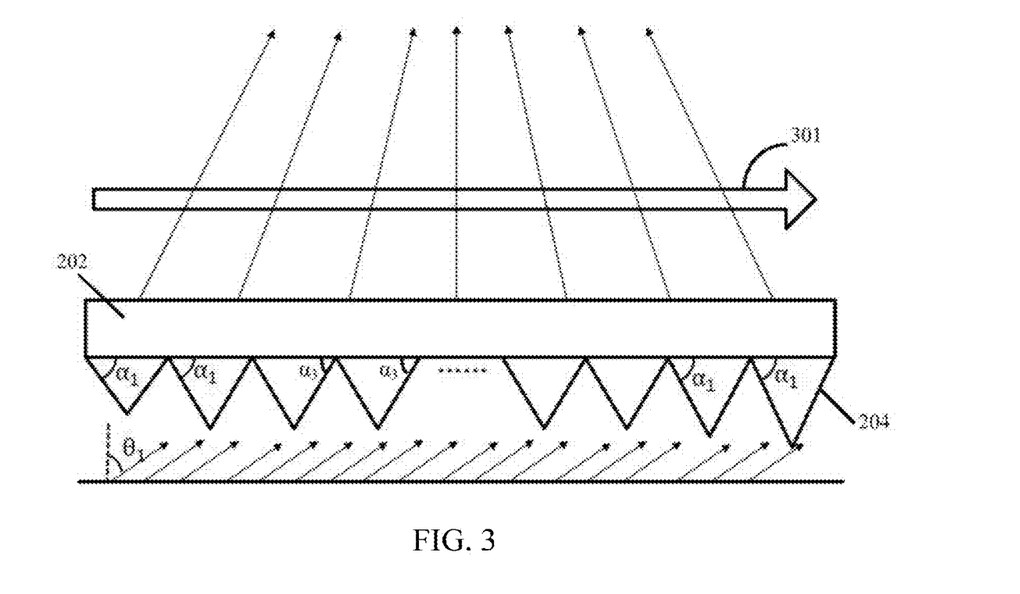
FIG. 3 is a schematic diagram showing the effect of the prism film provided by the embodiment shown in FIG. 2 on parallel light incident thereon.

FIG. 3 is a schematic diagram showing the effect of the prism film provided by the embodiment shown in FIG. 2 on parallel light incident thereon. As shown in FIG. 3, after the parallel light is obliquely incident on the prism film 200, the prisms on the prism film 200 may adjust the direction of the outgoing light such that the outgoing light travels in a predetermined direction. In this embodiment, the plurality of prisms 204 on the prism film 200 have different first and second bottom angles. In a particular embodiment, the first bottom angles α1 and the second bottom angles α3 of the plurality of prisms 204 may be gradually increased along a direction parallel to a horizontal component of light incident on the prisms 204 (as indicated by arrow 301 in FIG. 3).

In an exemplary embodiment, the plurality of prisms 204 may be arranged in parallel in a direction parallel to the surface of the substrate 202. However, this is not intended to limit the disclosure to this particular arrangement. Those skilled in the art may easily recognize how to adapt the relevant parameters or conditions when employing different arrangements. As an example, the plurality of prisms 204 may also be arranged in an array on the surface of the substrate 202.

Figure 4A:
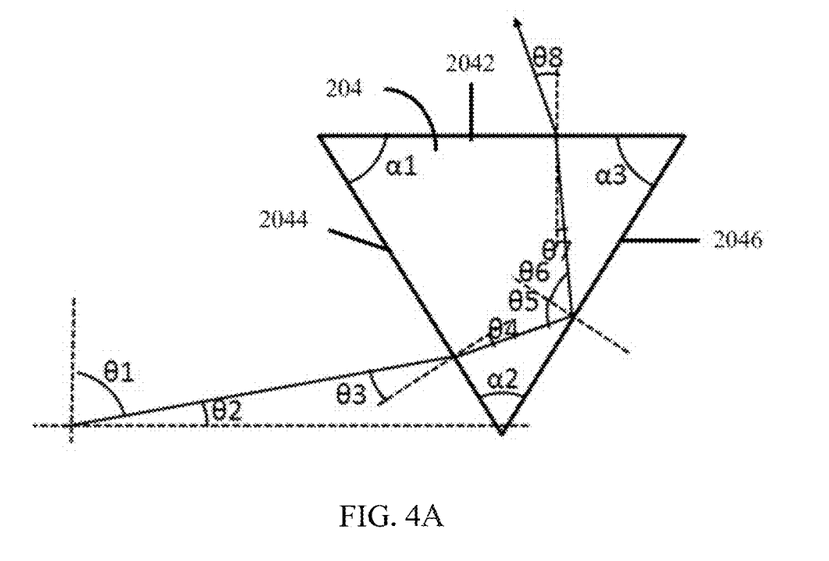
FIGS. 4A and 4B schematically show two example optical paths of light transmitting through a prism film in the embodiment shown in FIG. 2, respectively.
Figure 4B:
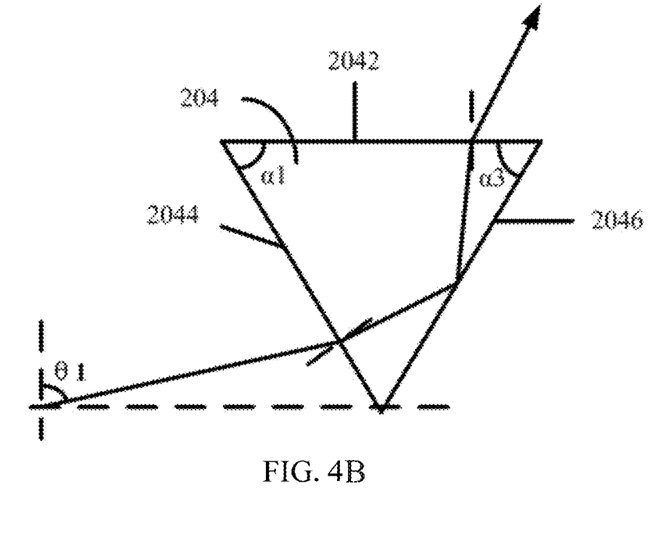

FIGS. 4A and 4B schematically show two example optical paths of light transmitting through a prism film in the embodiment shown in FIG. 2, respectively. As shown in FIGS. 4A and 4B, the parameters of each prism 204 (specifically, the first bottom angle α1 and the second bottom angle α3) may be configured such that light enters the prism 204 from the second optical surface 2044 and then is reflected by the third optical surface 2046 to the first optical surface 2042 and emerges from the first optical surface 2042 in a way of being deflected toward a center of the substrate 202. An example method of determining a first bottom angle and a second bottom angle of a prism according to a predetermined optical path (a desired optical path) is described in detail below in conjunction with FIG. 4A. In the illustrated embodiment, α1, α2, and α3 represent the first bottom angle, the apex angle, and the second bottom angle of the prism 204, respectively, n represents a refractive index of the prism, θ1 represents an angle facing the substrate 202 between a direction of the light incident on the second optical surface 2044 of the prism and a normal to the surface of the substrate 202°, θ2 represents the complementary angle of θ1, θ3 and θ4 represent an incident angle and a refraction angle of the light at the second optical surface 2044 of the prism 204, respectively, θ5 and θ6 represent an incident angle and a reflection angle of light at the third optical surface 2046 of the prism 204, respectively, and θ7 and θ8 represent an incident angle and a refraction angle of the light at the first optical surface 2042 of the prism 204, respectively.

As shown in FIG. 4A, the following relationships may be obtained according to the geometric relationship:

$$\theta 1 + \theta 2 = \frac{\pi}{2} \quad (1)$$

$$\theta 3 + \frac{\pi}{2} = \pi - \theta 2 - \alpha 1 \quad (2)$$

$$\alpha 1 + \alpha 2 + \alpha 3 = \pi \quad (3)$$

$$\theta 4 + \theta 5 = \alpha 2 \quad (4)$$

$$\frac{\pi}{2} - \theta 7 = \pi - \left(\frac{\pi}{2} - \theta 6\right) - \alpha 3 \quad (5)$$

Light incident on the second optical surface 2044 emerges at an angle θ8 sequentially via the refraction by the second optical surface 2044, the reflection by the third optical surface 2046, and the refraction by the first optical surface 2042. According to the law of refraction and the law of reflection, the following relationships may be obtained:

$$\sin \theta 3 = n * \sin \theta 4 \quad (6)$$

$$\theta 5 = \theta 6 \quad (7)$$

$$n * \sin \theta 7 = \sin \theta 8 \quad (8)$$

Additionally, in order to enable light incident into each prism 204 to follow the optical path shown in FIGS. 4A and 4B, i.e., light entering the prism 204 from the second optical surface 2044 is reflected by the third optical surface 2046 and then emerges from the first optical surface 2042, the following relationship also needs to be satisfied:

$$\frac{\pi}{2} - \theta 4 - \alpha 1 < \alpha 3 \quad (9)$$

According to the above relationships (1)-(9), the following relationships among θ8, θ1, n, α1, and α3 may be obtained:

$$\sin \theta 8 = n * \sin\left[\alpha 1 + 2 * \alpha 3 - \pi + \arcsin\frac{\sin(\theta 1 - \alpha 1)}{n}\right] \quad (10)$$

$$\arcsin\frac{\sin(\theta 1 - \alpha 1)}{n} > \frac{\pi}{2} - \alpha 1 - \alpha 3 \quad (11)$$

In an alternative embodiment, the structural parameters of the prism 204 (specifically, the first bottom angle α1 and the second bottom angle α3) may also be configured such that light incident on the third optical surface 2046 is totally reflected on the third optical surface 2046, so as to improve the intensity of light emerging from the first optical surface 2042. In this case, it is also necessary to satisfy the following relationship:

$$\theta 5 > \arcsin\frac{1}{n} \quad (12)$$

According to the above relationships (1)-(8) and (12), the following relationship may be further derived:

$$\theta 5 = \pi - \alpha 1 - \alpha 3 - \arcsin\frac{\sin(\theta 1 - \alpha 1)}{n} > \arcsin\frac{1}{n} \quad (13)$$

According to the above relationships (10), (11), and (13), in the case where the angle θ1 between the direction of the light incident on the second optical surface 2044 of the prism 204 and the normal to the surface of the substrate 202, the outgoing angle θ8 of light emerging from the first optical surface 2042 and the refractive index n of the prism 204 are known, the relationship between the first bottom angles α1 and α3 may be derived.

In the illustrated embodiment, each prism 204 may have an isosceles triangular cross section, i.e., α1=α3=α. In this configuration, the first bottom angle α1 and the second bottom angle α3 of the prism may be determined according to the above relationships (10), (11), and (13). In the case where θ1 is fixed, α1 and α3 change with θ8.

However, it should be noted that in the case where θ1 is small, light entering the prism 204 from the second optical surface 2044 may not be reflected by the third optical surface 2046, but be directly incident on the first optical surface 2042 from the second optical surface 2044 and emerges from the first optical surface 2042. In this case, the travelling direction of the light emerging from the prism 204 does not conform to the desired optical path, which may also cause a certain amount of light energy loss. Therefore, in this embodiment, θ1 may be configured to have a larger angle, for example, 65°≤θ1≤85°. As an example, such a prism film 200 may be applied to a backlight module of a display device because light emerging from a light guide plate of a backlight module generally has a large outgoing angle.

As already mentioned above, such a prism film 200 may be applied to a virtual reality display device. As an example, the prism film 200 may be provided on the light outgoing side of the light guide plate of the virtual reality display device. In this case, when the optical design is performed, the outgoing angle θ8 of the light emerging from the first optical surface 2042 (which may be determined according to a desired optical path emerging from the display screen) may be predetermined such that the light emerging from the first the angle θ1 between the direction of the light incident on the prisms 204 and the normal to the surface of the substrate 202 is equal to 75°, which is equal to the outgoing angle of the light emerging from the display screen 102;

the refractive index of the prisms 204 is n=1.49;

the pupil diameter of the eye 106 is set to be 8 mm, and α1=α3=α.

Based on the above parameters and according to the above relationship (10), the first bottom angles α1 and the second bottom angles α3 (α1=α3=α) at the respective positions may be calculated as listed in Table 1.

TABLE 1

The outgoing angles of the light rays emerging from the prisms at respective positions and the corresponding bottom angles of the prisms

| 位置 | −30 | −28 | −26 | −24 | −22 | −20 | −18 | −16 | −14 | −12 |
|---|---|---|---|---|---|---|---|---|---|---|
| θ8 | −19.3067 | −18.5474 | −17.6181 | −16.5616 | −15.4055 | −14.1717 | −12.8779 | −11.5386 | −10.1647 | −8.7642 |
| α | 79.5 | 79 | 78.5 | 78 | 77.5 | 76.5 | 76 | 75 | 74.5 | 73.5 |

| 位置 | −10 | −8 | −6 | −4 | −2 | 0 | 2 | 4 | 6 | 8 | 10 |
|---|---|---|---|---|---|---|---|---|---|---|---|
| θ8 | −7.3422 | −5.9014 | −4.4438 | −2.9717 | −1.4888 | 0 | 1.4888 | 2.9717 | 4.4438 | 5.9014 | 7.3422 |
| α | 73 | 72 | 71 | 70 | 69.5 | 68.5 | 67.5 | 67 | 66 | 65 | 64.5 |

| 位置 | 12 | 14 | 16 | 18 | 20 | 22 | 24 | 26 | 28 | 30 |
|---|---|---|---|---|---|---|---|---|---|---|
| θ8 | 8.7642 | 10.1647 | 11.5386 | 12.8779 | 14.1717 | 15.4055 | 16.5616 | 17.6181 | 18.5474 | 19.3067 |
| α | 63.5 | 62.5 | 62 | 61 | 60.5 | 60 | 59 | 58.5 | 58 | 57.5 | optical surface 2042 substantially conforms to the desired optical path as shown in FIGS. 1A and 1B, in order to increase the utilization rate of light energy. In the virtual reality display device, it is generally also possible to predetermine the outgoing angle of light emerging from the light guide plate, i.e., θ1. Therefore, the first bottom angles α1 and the second bottom angles α3 of the respective prisms may be determined according to the above relationships (10), (11), and (13). In the case where the prisms are isosceles prisms, α1=α3. Thus, the respective prisms 204 on the prism film may be designed based on the determined first bottom angles α1 and second bottom angles α3 such that the light emerging from the respective prisms substantially conform to the desired optical path required in the virtual reality display device.

Figure 5A:
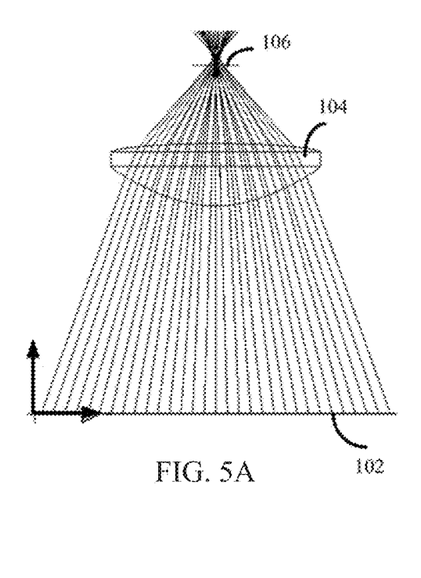
FIG. 5A shows a simulated optical path of a virtual reality display device with the prism film of the embodiment shown in FIG. 2.

FIG. 5A shows a simulated optical path of a virtual reality display device with the prism film of the embodiment shown in FIG. 2. In the example shown in FIG. 5A, the prism film 200 may be provided on the light outgoing side of the light guide plate of the VR display device, and the side of the prism film 200 provided with the prisms 204 faces the light guide plate so that light emerging from the light guide plate may enter the prism 204 from the second optical surfaces 2044 of the prisms 204. In addition, the virtual reality display device in FIG. 5A may also be designed in the following way:

the display screen 102 has a size of 62 mm, a center of the display screen 102 is located at 0 mm, and the interval between respective positions is 2 mm;

the angles of the light rays emerging from the display screen 102 at different positions may be pre-designed according to the desired optical paths of the VR, assuming that the angles are equal to the outgoing angles θ8 of the light rays emerging from the first optical surfaces of the prisms, and the angles may be specifically listed in Table 1;

Based on the above configured parameters, the simulation results as shown in FIG. 5A may be obtained by establishing a model with simulation software Lighttools. As can be seen from FIG. 5A, the light emerging from the display screen 102 (for example, light emerging from the edge portion) may substantially match the desired optical path of the VR by using the prism film 200 having the prisms 204 with varying bottom angles in the embodiment shown in FIG. 2, thereby improving the utilization rate of light energy.

Figure 5B:
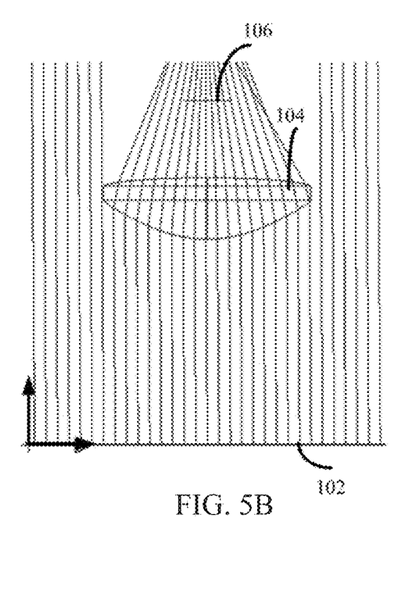
FIG. 5B shows a simulated optical path of a virtual reality display device with the prism film having the prisms of the same bottom angle.

FIG. 5B shows a simulated optical path of a virtual reality display device with the prism film having the prisms of the same bottom angle. In FIG. 5B, a prism film having the same bottom angle (e.g., 56°) is used, and other parameters are the same as those in FIG. 5A. Obviously, in FIG. 5B, since light emerging from the edge of the display device cannot enter the lens, and only light emerging at the central portion may enter the user's eye 106 through the imaging lens, it will cause a large waste of light energy. According to the simulation results in both cases, the energy utilization rate of FIG. 5A is about 2.76 times that of FIG. 5B.

Figure 6:
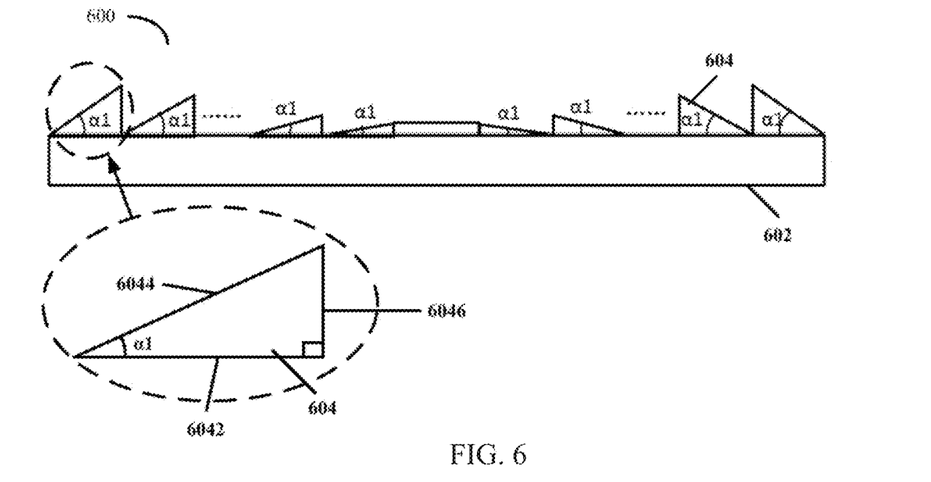
FIG. 6 shows a cross-sectional view of a prism film provided according to another example embodiment of the present disclosure.

FIG. 6 shows a cross-sectional view of a prism film provided according to another example embodiment of the present disclosure. In FIG. 6, an enlarged view of the prism 604 (inside the dashed oval below the prism film) is further illustrated. As shown in FIG. 6, the prism film 600 includes a substrate 602 and a plurality of prisms 604 on a surface of the substrate 602. Each prism 604 has a right triangular cross-section and has a first optical surface 6042, a second optical surface 6044, and a third optical surface 6046 that are perpendicular to the right triangular cross-section. The first optical surface 6042 is parallel to the surface of the substrate 602. The first optical surface 6042 and the second optical surface 6044 form a first bottom angle α1 of the prism, and the first optical surface 6042 and the third optical surface 6046 form a second bottom angle α1 of the prism (the second bottom angle is a right angle).

Figure 7:
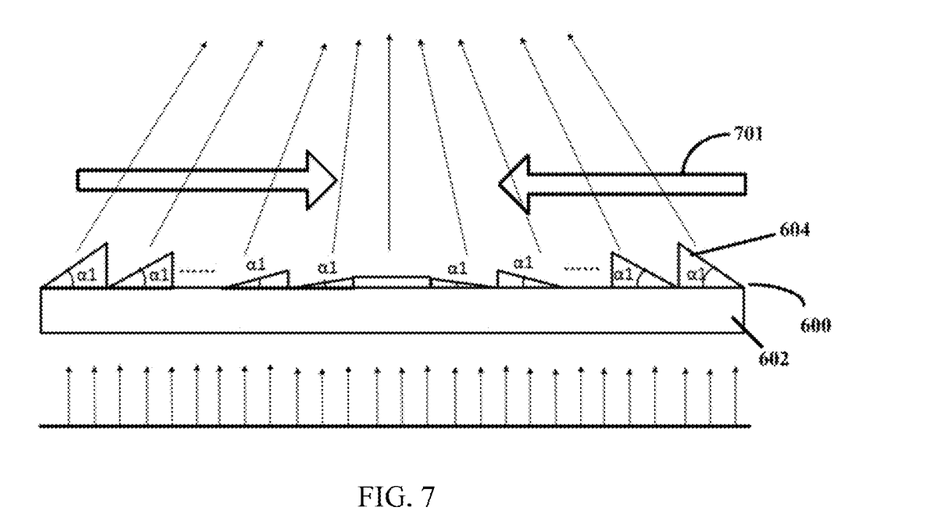
FIG. 7 is a schematic diagram showing the effect of the prism film provided by the embodiment shown in FIG. 6 on the parallel light incident perpendicular thereon.

FIG. 7 is a schematic diagram showing the effect of the prism film provided by the embodiment shown in FIG. 6 on the parallel light incident perpendicular thereon. As shown in FIG. 7, after the parallel light is incident perpendicularly onto the prism film 600, the prism film 600 may adjust the direction of the outgoing light such that the outgoing light travels in a predetermined direction. In the embodiment shown in FIGS. 6 and 7, the first bottom angles α1 of the plurality of prisms 604 may gradually decrease in a direction from the edge of the substrate 602 toward the center of the substrate 602 (as indicated by arrow 701 in FIG. 7), in order that the optical path of light emerging from the edge of the display screen substantially matches the desired optical path when such a prism film 600 is applied to a display device, thereby improving the utilization rate of light energy.

Figure 8A:
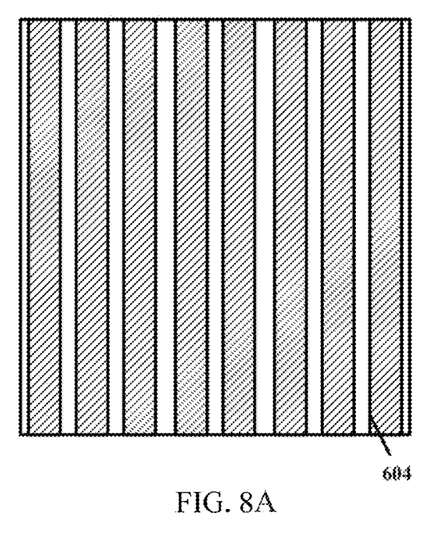
FIGS. 8A and 8B show schematic diagrams of two example arrangements of prisms on a substrate, respectively.
Figure 8B:
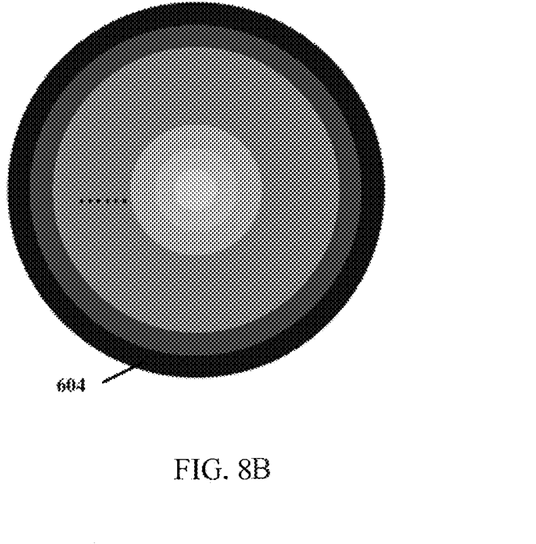

In the embodiments illustrated in FIGS. 6 and 7, the plurality of prisms 604 may be arranged in parallel along a direction parallel to the surface of the substrate 602 (as shown in FIG. 8A). In an alternative embodiment, the plurality of prisms may be arranged in a way of a plurality of concentric circles (as shown in FIG. 8B). However, this is not intended to limit the disclosure to these particular arrangements. Those skilled in the art may easily recognize how to adapt the relevant parameters or conditions when employing different arrangements.

Figure 9:
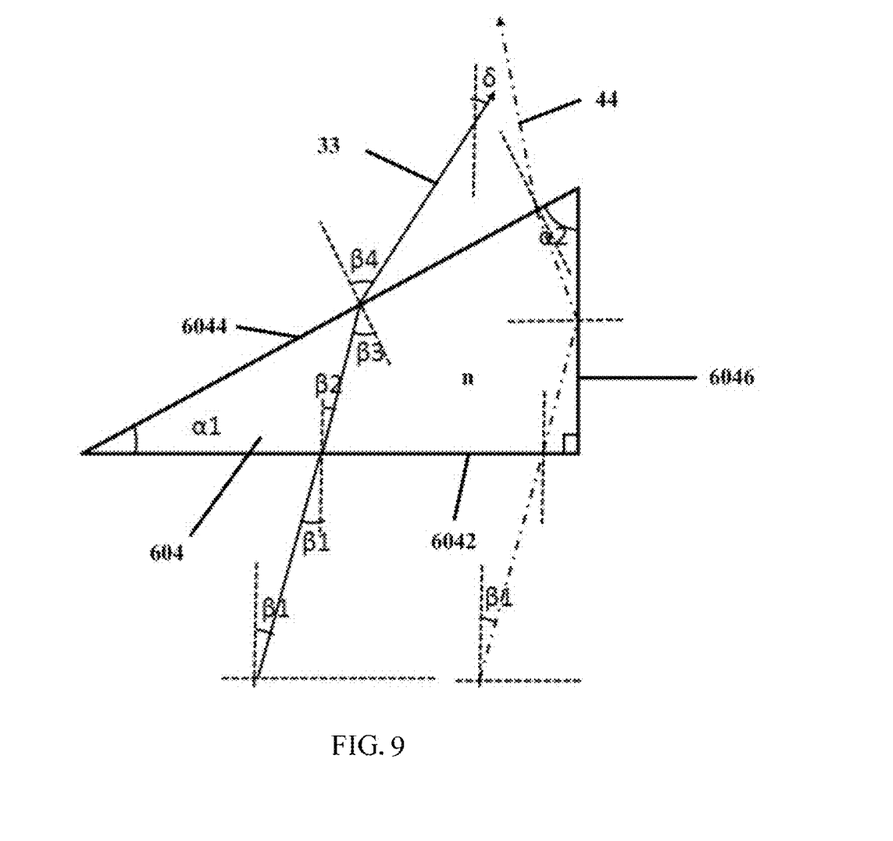
FIG. 9 shows an example optical path of light transmitting through the prism film in the embodiment shown in FIG. 6.

FIG. 9 shows an example optical path of light transmission through the prism film in the embodiment shown in FIG. 6. As shown in the optical path 33 in FIG. 9 (indicated by solid arrow), the parameters of each prism 602 (specifically, the first bottom angle α1) may be configured such that light enters the prism from the first optical surface 6042, is incident onto the second optical surface 6044, is refracted by the second optical surface 6044, and then emerges from the second optical surface 6044 in a way of being deflected toward the center of the substrate.

An example method of determining a first bottom angle of a prism based on a predetermined optical path (desired optical path) is described in detail below in conjunction with FIG. 9. In the illustrated embodiment, α1 and α2 represent a first bottom angle (first acute angle) and an apex angle (second acute angle) of the prism, respectively, n represents a refractive index of the prism, β1 and β2 represent an incident angle and a refraction angle of light at the first optical surface 6042, respectively, β3 and β4 represent an incident angle and a refraction angle of light at the second optical surface 6044, respectively, δ represents an angle between light emerging from the second optical surface 6044 and a normal to the first optical surface 6042.

As shown in FIG. 9, the following relationships may be obtained according to the geometric relationship:

$$\alpha 1 + \alpha 2 = \frac{\pi}{2} \qquad (14)$$

$$\beta 3 - \beta 2 + \alpha 2 = \frac{\pi}{2} \qquad (15)$$

$$\alpha 1 + \delta = \beta 4 \qquad (16)$$

According to the optical path 33, the light incident on the first optical surface 6042 is sequentially refracted by the first optical surface 6042 and the second optical surface 6044 and then emerges from the second optical surface 6044 at the outgoing angle β4. According to the law of refraction, the following relationships may be obtained:

$$\sin \beta 1 = n^* \sin \beta 2 \qquad (17)$$

$$n^* \sin \beta 3 = \sin \beta 4 \qquad (18)$$

Additionally, in order for light entering the prism from the first optical surface 6042 to emerge from the second optical surface 6044, it is desirable that the light does not satisfy the total reflection condition on the second optical surface 6044, i.e., the following relationship needs to be satisfied:

$$\beta 3 < \arcsin \frac{1}{n} \qquad (19)$$

According to the above relationships (14)-(19), the following relationships among δ, β1, n, and α1 may be obtained:

$$\delta = \arcsin\left[n * \sin\left(\alpha 1 + \arcsin\frac{\sin\beta 1}{n}\right)\right] - \alpha 1 \qquad (20)$$

$$\alpha 1 + \arcsin\frac{\sin\beta 1}{n} < \arcsin\frac{1}{n} \qquad (21)$$

According to the above relationships (20) and (21), in the case where the incident angle 131 of the light incident on the first optical surface 6042 of the prism 604, the angle δ between the light emerging from the second optical surface 6044 and the normal to the first optical surface 6042 and the refractive index n of the prism 604 are known (assuming δ is equal to the outgoing angle of the light emerging from the display screen), the first bottom angle α1 of the prism 604 may be calculated.

Further, as shown in FIG. 9, in the case where the incident angle 131 of light incident on the first optical surface 6042 of the prism 604 is 0, that is, perpendicularly incident to the first optical surface 6042, the light may be directly incident on the second optical surface 6044 from the first optical surface 6042 along the optical path 33. However, in the case where the incident angle β1 of light incident on the first optical surface 6042 of the prism 604 is greater than 0, light near the third optical surface 6046 may travel along the optical path 44 (indicated by the broken line). Specifically, light entering the prism from the first optical surface 6042 is first incident on the third optical surface 6046 and then incident on the second optical surface 6044 after being reflected by the third optical surface 6046. In the latter case, β1, δ, n, and α1 will not satisfy the above relationships (20) and (21), which will cause light energy loss to a certain degree. Therefore, in order to further improve the utilization rate of light energy, β1 may have a small angle, for example, 0°≤β1≤20°. However, this is not intended to limit the scope of the present disclosure to this particular range of β1.

As an example, in the case where the prism film 600 in the embodiment shown in FIG. 6 is applied to a virtual reality display device, the prism film 600 may be provided on the light outgoing side of the display panel of the virtual display device as a part of the display device. In this case, the angle δ between the light emerging from the second optical surface 6044 and the normal to the first optical surface 6042 may be pre-designed during optical design such that light emerging from the second optical surface 6044 substantially conforms to the desired optical path as shown in FIGS. 1A and 1B. That is, regardless of emerging from the center of the display screen or from the edge of the display screen, the light may enter the user's eye substantially via the lens, in order to improve the utilization rate of light energy. In the virtual reality display device, it is generally also possible to predetermine the outgoing angle β1 of light emerging from the display panel (generally most of the light approximately perpendicularly emerges), that is, β1=0. Therefore, in the case where the refractive index n of the prism 604 is known, the first bottom angle α1 of each prism 604 may be determined according to the above relationships (20) and (21). Thus, respective prisms 604 on the prism film may be designed based on the determined first bottom angle α1 such that the light emerging from the respective prism 604 substantially conforms to the desired optical path required in the virtual reality display device.

Alternatively, the prism film shown in FIG. 6 may be provided on the light outgoing side of the light guide plate of the virtual reality display device. In this case, those skilled in the art may easily recognize that the angle of the light emerging from the light guide plate may be adjusted by providing other optical components between the prism film and the light guide plate, to obtain a relatively small β1, so that the light is approximately perpendicularly incident to the first optical surface of the prism.

Figure 10A:
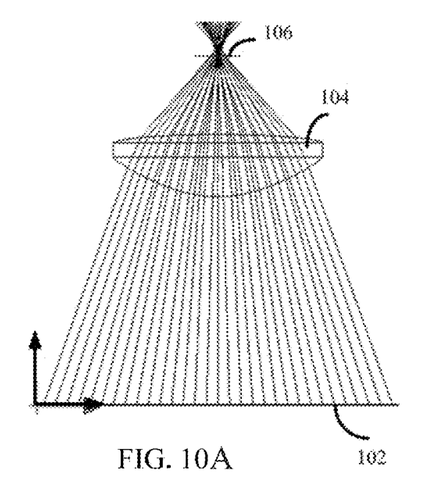
FIG. 10A shows a simulated optical path of a virtual reality display device with the prism film of the embodiment shown in FIG. 6.

FIG. 10A shows a simulated optical path of a virtual reality display device with the prism film of the embodiment shown in FIG. 6. In the example shown in FIG. 10A, the prism film 600 may be provided on the light outgoing side of the display panel of the VR display device, and the side of the prism film 600 on which the prisms 604 are provided faces away from the display panel such that light emerging from the display panel may enter the prisms from the first optical surfaces 6042. In addition, the device in FIG. 10A may also be configured as follows:

the display screen 102 has a size of 62 mm, a center of the display screen 102 is located at 0 mm, and the interval between respective positions is 2 mm;

the angles of the light rays emerging from the display screen 102 at different positions may be pre-designed according to the desired optical paths of the VR, assuming that the angles are equal to the angles δ between the light rays emerging from the second optical surfaces of the prisms and the normal to the first optical surface, and the angles may be specifically listed in Table 2;

light is incident perpendicularly to the first optical surface of each prism, i.e., β1=0°.

the refractive index of the prism 204 is n=1.49.

According to the above relations (20) and (21), a (α1=α) at respective positions may be calculated as listed in Table 2.

Based on the above configured parameters, the simulation results as shown in FIG. 10A may be obtained by establishing a model with simulation software Lighttools. As can be seen from FIG. 10A, the light emerging from the display screen 102 may be substantially match the desired optical path of the VR by using the prism film having the prisms with varying bottom angles in the embodiment shown in FIG. 6, thereby improving the utilization rate of light energy.

Figure 10B:
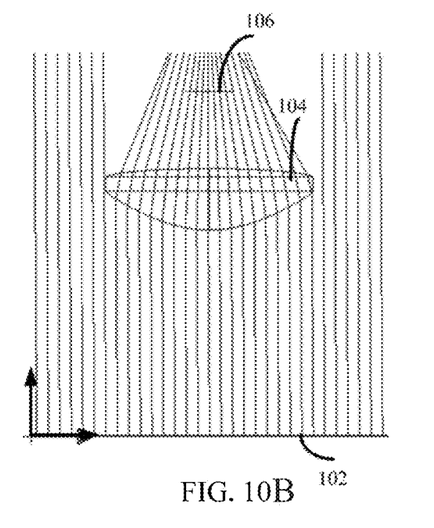
FIG. 10B shows a simulated optical path of the virtual display device without the prism film in the embodiment shown in FIG. 6.

FIG. 10B shows a simulated optical path of the virtual display device without the prism film in the embodiment shown in FIG. 6. In FIG. 10B, the prism film in the embodiment shown in FIG. 6 is not applied on the light outgoing side of the display panel, and other parameters are the same as those in FIG. 10A. Obviously, in FIG. 10B, since light emerging at the edge of the display device cannot enter the lens, only light emerging at the central portion may enter the user's eye through the imaging lens, it will cause a large waste of light energy. According to the simulation results in both cases, the energy utilization rate of FIG. 10A is about 2.76 times that of FIG. 10B.

To illustrate the particular effects, advantages, and feasibilities of the present disclosure, the use of the prism film described herein in a virtual reality display device is merely an exemplary application of a prism film that is not intended to limit the scope of the present disclosure to that particular application. With the embodiments of the present disclosure, when the prism film is applied to other scenes, those skilled in the art may easily recognize how to adapt relevant parameters and conditions. As an example, the prism film provided by the embodiments of the present disclosure may also be used to achieve some special display purposes, such as anti-peep.

Another aspect of the present disclosure provides a backlight module. The backlight module may include the prism film according to the present disclosure, such as the prism film according to one or more embodiments disclosed in detail above. Thus, for alternative embodiments of the backlight module, reference may be made to the embodiments of the prism film.

Figure 11:
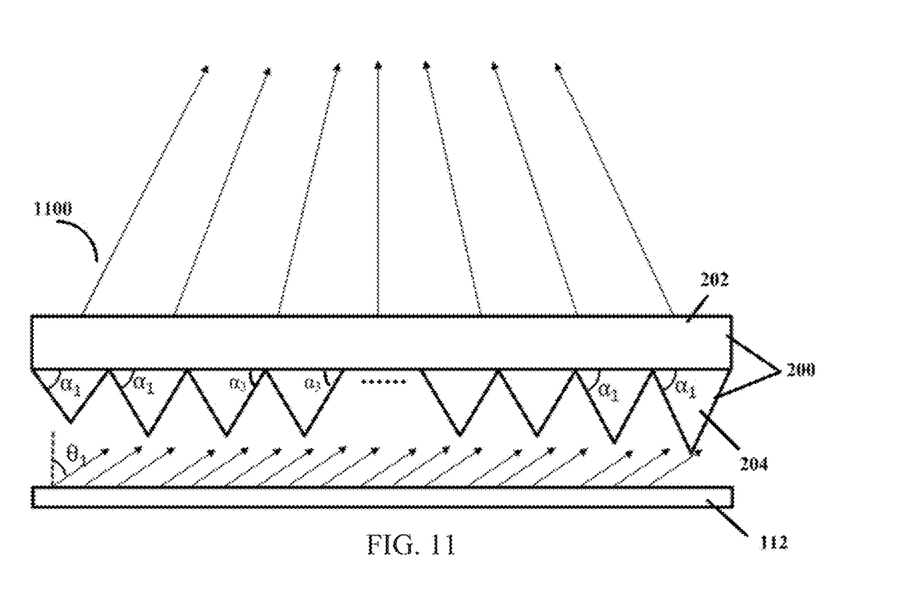
FIG. 11 shows a schematic diagram of an example backlight module provided according to an embodiment of the present disclosure.

FIG. 11 shows a schematic diagram of an example backlight module provided according to an embodiment of the present disclosure. As shown in FIG. 11, the backlight module 1100 may include a light guide plate 112 and a prism film 200 in the embodiment shown in FIG. 2, and the prism film 200 may be located on a light outgoing side of the light guide plate 112.

In the embodiment shown in FIG. 11, the plurality of prisms 204 of the prism film 200 are arranged in parallel in

TABLE 2

The outgoing angles of the light rays emerging from the prisms at respective positions and the corresponding bottom angles of the prisms

| 位置 | −30 | −28 | −26 | −24 | −22 | −20 | −18 | −16 | −14 | −12 |
|---|---|---|---|---|---|---|---|---|---|---|
| δ | −19.3067 | −18.5474 | −17.6181 | −16.5616 | −15.4055 | −14.1717 | −12.8779 | −11.5386 | −10.1647 | −8.7642 |
| α | 31.2 | 30.4 | 29.4 | 28.2 | 26.8 | 25.2 | 23.4 | 21.4 | 19.2 | 16.9 |

| 位置 | −10 | −8 | −6 | −4 | −2 | 0 | 2 | 4 | 6 | 8 | 10 |
|---|---|---|---|---|---|---|---|---|---|---|---|
| δ | −7.3422 | −5.9014 | −4.4438 | −2.9717 | −1.4888 | 0 | 1.4888 | 2.9717 | 4.4438 | 5.9014 | 7.3422 |
| α | 14.4 | 11.7 | 8.9 | 6 | 3 | 0 | 3 | 6 | 8.9 | 11.7 | 14.4 |

| 位置 | 12 | 14 | 16 | 18 | 20 | 22 | 24 | 26 | 28 | 30 |
|---|---|---|---|---|---|---|---|---|---|---|
| δ | 8.7642 | 10.1647 | 11.5386 | 12.8779 | 14.1717 | 15.4055 | 16.5616 | 17.6181 | 18.5474 | 19.3067 |
| α | 16.9 | 19.2 | 21.4 | 23.4 | 25.2 | 26.8 | 28.2 | 29.4 | 30.4 | 31.2 | a direction parallel to the surface of the substrate 202. The first bottom angle and the second bottom angle are configured such that light entering the prism from the second optical surface 2044 may be reflected toward the first optical surface 2042 by the third optical surface 2046 and then emerge from the first optical surface 2042 in a way of being deflected toward the center of the substrate 202.

In the illustrated embodiment, the side of the prism film 200 provided with the prisms 204 faces the light outgoing side of the light guide plate 112, and the outgoing angle of light emerging from the light guide plate 112 ranges from about 65° to about 85°.

Figure 12:
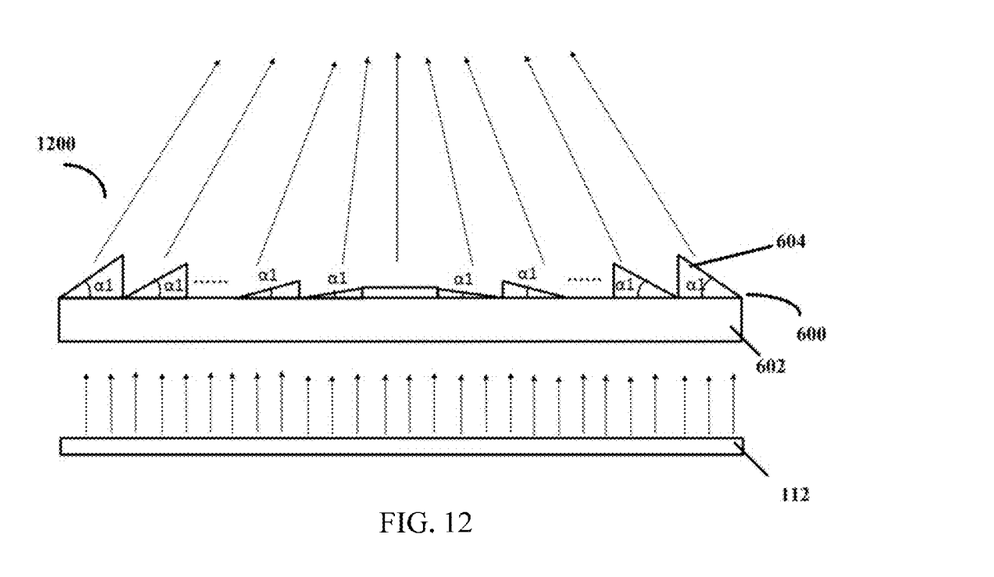
FIG. 12 schematically shows a schematic diagram of another example backlight module provided according to an embodiment of the present disclosure.

FIG. 12 schematically shows a schematic diagram of another example backlight module provided according to an embodiment of the present disclosure. As shown in FIG. 12, the backlight module 1200 may include a light guide plate 112 and a prism film 600 in the embodiment shown in FIG. 6, and the prism film 600 may be located on the light outgoing side of the light guide plate 112.

In the embodiment shown in FIG. 12, the prism 604 on the prism film 600 has a right triangular cross-section, and the first bottom angle of the prism 604 is configured such that light entering the prism 604 from the first optical surface 6042 may be directly incident onto the second optical surface 6044, and emerges from the second optical surface in a way of being deflected toward the center of the substrate 602.

In the illustrated embodiment, the side of the prism film 600 provided with the prisms 604 faces away from the light outgoing side of the light guide plate 112, and the incident angle of light incident onto the first optical surface 6042 of the prism 604 from the light guide plate 112 ranges from about 0° to about 20°. As an example, other optical components may be provided between the light guide plate 112 and the prism film 600 in order to adjust the outgoing angle of the light emerging from the light guide plate 112 so that the light is incident on the first optical surface 6042 of the prism 604 at a relatively small angle (for example, 0°).

The light guide plate provided by the embodiments shown in FIGS. 11 and 12 may be applied to, for example, a virtual reality display device such that light emerging from the display screen may enter the user's eye through the imaging lens, thereby improving the utilization rate of light energy.

Another aspect of the present disclosure provides a display device. The display device may include a prism film according to the present disclosure, such as a prism film according to one or more embodiments disclosed in detail above. Thus, for alternative embodiments of the display device, reference may be made to embodiments of a prism film.

Figure 13:
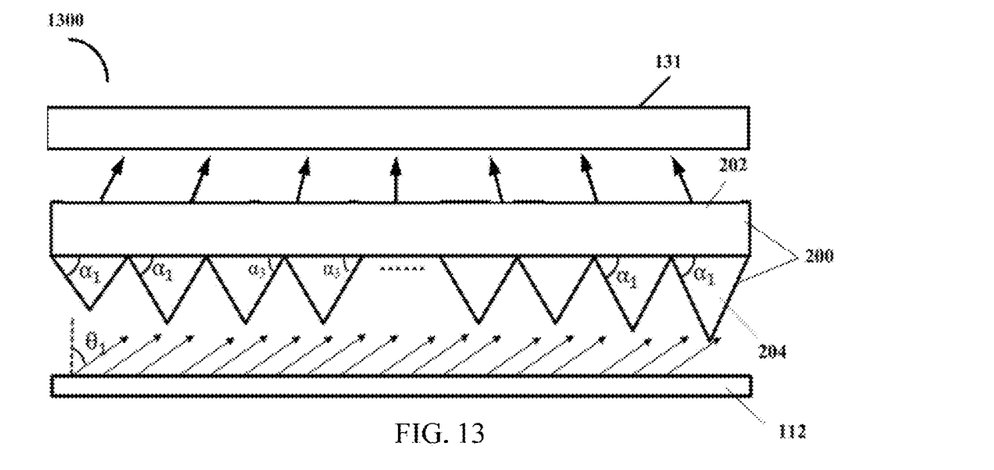
FIG. 13 is a schematic diagram of an example display device provided according to an embodiment of the present disclosure.

FIG. 13 is a schematic diagram of an example display device provided according to an embodiment of the present disclosure. As shown in FIG. 13, the display device 1300 may include a backlight module or a light guide plate 112, a display panel 131, and a prism film 200 in the embodiment shown in FIG. 2. In this embodiment, the prism film 200 may be located between the light guide plate 112 and the display panel 131.

In the embodiment shown in FIG. 13, the plurality of prisms 204 may be arranged in a direction parallel to the surface of the substrate 202. The first bottom angle and the second bottom angle may be configured such that light entering the prisms 204 from the second optical surface 2044 may be reflected toward the first optical surface 2042 by the third optical surface 2046, and then emerge from the first optical surface 2042 in a way of being deflected toward the center of the substrate 202. In this embodiment, the side of the prism film 200 provided with the prisms 204 faces the light outgoing side of the light guide plate 112, and the outgoing angle of the light emerging from the light guide plate 112 may range from about 65° to about 85°.

Figure 14:
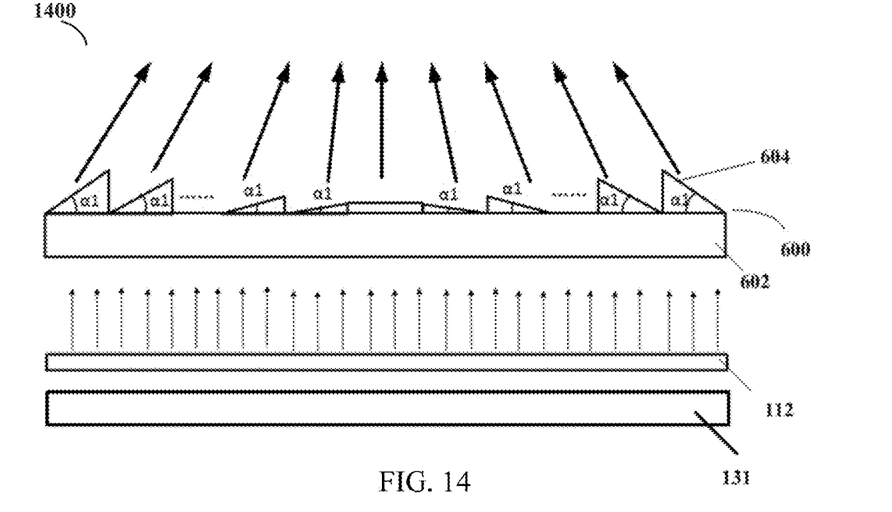
FIG. 14 is a schematic diagram of another example display device provided according to an embodiment of the present disclosure.

FIG. 14 is a schematic diagram of another example display device provided according to an embodiment of the present disclosure. As shown in FIG. 14, the display device 1400 may include a backlight module or a light guide plate 112, a display panel 131, and a prism film 600 in the embodiment shown in FIG. 6. In this embodiment, the prism film 600 may be located on the light outgoing side of the display panel 131.

In the embodiment shown in FIG. 14, the prism 604 on the prism film 600 may have a right triangular cross section. The first bottom angle of the prism 604 is configured such that light entering the prism from the first optical surface 6042 may be incident directly onto the second optical surface 6044, and then emerge from the second optical surface 6042 in a way of being deflected toward the center of the substrate 602. In this embodiment, the side of the prism film 600 provided with the prisms 604 faces away from the light outgoing side of the display panel 131. The outgoing angle of light emerging from the display panel 131 may range from about 0° to about 20°.

The display device provided according to an embodiment of the present disclosure may be a virtual display device. With the display device provided according to an embodiment of the present disclosure, light emerging from the display device may travel according to predetermined ideal trajectories. Specifically, light emerging from the display device may enter the user's eye via the imaging lens of the virtual reality device, thereby improving the utilization rate of light energy.

It is to be understood that the term "about" used prior to a particular value herein means that the particular value can be tolerate a certain range of error, and values within the range of error should be construed as falling within the scope of the present disclosure. As an example, "about 85°" may indicate an allowable error range of, for example, −1° to +1°, that is, any value within the range of 84° to 86° should fall within the range of values limited by the present disclosure.

As an alternative embodiment, the display device provided according to embodiments of the present disclosure may also be used in other scenes, for example, for the purpose of anti-peeping, and a better anti-peeping effect may be achieved.

The foregoing description of the embodiment has been provided for purpose of illustration and description. It is not intended to be exhaustive or to limit the application. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the application, and all such modifications are included within the scope of the application.

What is claimed is:

1. A backlight module comprising a light guide plate and a prism film on a light outgoing side of the light guide plate, the prism film comprising a substrate and a plurality of prisms on a surface of the substrate, each of the plurality of prisms having a triangular cross section and having a first optical surface, a second optical surface, and a third optical surface that are perpendicular to the triangular cross section, wherein the plurality of prisms are arranged in parallel in a first direction parallel to the surface of the substrate, wherein the first optical surface is parallel to the surface of the substrate, wherein the first optical surface and the second optical surface form a first bottom angle, wherein the first optical surface and the third optical surface form a second bottom angle, wherein at least one of the first bottom angle and the second bottom angle of the plurality of prisms gradually changes in a second direction parallel to the surface of the substrate, and wherein the second direction is perpendicular to the first direction,     wherein a side of the prism film provided with the prisms is opposite to a light outgoing side of the light guide plate,     wherein the second direction is a direction of a horizontal component of light outgoing from the light guide plate parallel to the surface of the substrate, and wherein the at least one of the first bottom angle and the second bottom angle of the plurality of prisms gradually increases in the second direction, and     wherein the first bottom angle and the second bottom angle are configured to satisfy the following relationship:

$$\sin\theta 8 = n*\sin\left[\alpha 1 + 2*\alpha 3 - \pi + \arcsin\frac{\sin(\theta 1 - \alpha 1)}{n}\right]$$

$$\arcsin\frac{\sin(\theta 1 - \alpha 1)}{n} > \frac{\pi}{2} - \alpha 1 - \alpha 3$$

wherein θ1 represents an angle, facing the substrate, between a direction of light incident on a prism of the plurality of prisms and a normal to the surface of the substrate, n represents a refractive index of the prism, α1 represents the first bottom angle, α3 indicates the second bottom angle, and θ8 represents an outgoing angle of light emerging from the first optical surface.

2. The backlight module according to claim 1, wherein the at least one of the first bottom angle and the second bottom angle of the plurality of prisms gradually increases in the second direction.

3. The backlight module according to claim 2, wherein the triangular cross section is an isosceles triangular cross section, and wherein the first bottom angle is equal to the second bottom angle.

4. The backlight module according to claim 1, wherein a height of the plurality of prisms relative to the substrate gradually increases in the second direction.

5. The backlight module according to claim 4, wherein the first optical surface of the plurality of prisms has a same shape.

6. The backlight module according to claim 1, wherein a gap is provided between two adjacent prisms.

7. The backlight module according to claim 1, wherein there is a blank area between the prisms and at least one edge of the substrate.

8. The backlight module according to claim 7, wherein the blank area is provided between the prisms and an edge of the substrate parallel to the prisms.

9. The backlight module according to claim 1, wherein the first bottom angle and the second bottom angle are configured such that light entering the prism from the second optical surface is reflected toward the first optical surface by the third optical surface, and then emerges from the first optical surface.

10. The backlight module according to claim 1, wherein the first bottom angle and the second bottom angle are configured such that light incident to the third optical surface is totally reflected at the third optical surface, and wherein the first bottom angle and the second bottom angle are further configured to satisfy the following relationship:

$$\theta 5 = \pi - \alpha 1 - \alpha 3 - \arcsin\frac{\sin(\theta 1 - \alpha 1)}{n} > \arcsin\frac{1}{n}$$

wherein θ5 represents an incident angle of the light at the third optical surface.

11. The backlight module according to claim 10, wherein the triangular cross section is an isosceles triangular cross section, and wherein the first bottom angle is equal to the second bottom angle.

12. The backlight module according to claim 1, wherein 65°≤θ1≤85°.

13. A display device comprising the backlight module according to claim 1 and a display panel, wherein the prism film is located between the light guide plate of the backlight module and the display panel, wherein the side of the prism film provided with the prisms is opposite to the light outgoing side of the light guide plate, and wherein an outgoing angle of light emerging from the light guide plate ranges from about 65° to about 85°.

14. The display device according to claim 13, wherein the display device is a virtual reality display device.

\* \* \* \* \*

UNITED STATES PATENT AND TRADEMARK OFFICE
CERTIFICATE OF CORRECTION

PATENT NO. : 11,327,207 B2
APPLICATION NO. : 17/161029
DATED : May 10, 2022
INVENTOR(S) : Liangliang Jin et al.

It is certified that error appears in the above-identified patent and that said Letters Patent is hereby corrected as shown below:

In the Specification

Column 12, Line 27, delete "angle 131" and insert therefor -- angle $\beta1$ --.
Column 12, Line 36, delete "angle 131" and insert therefor -- angle $\beta1$ --.
Column 13, Line 46, delete "a ($\alpha1 = \alpha$)" and insert therefor -- $\alpha$ ($\alpha1 = \alpha$) --.

Signed and Sealed this
Sixteenth Day of August, 2022

Katherine Kelly Vidal
*Director of the United States Patent and Trademark Office*